Patented June 1, 1943

2,320,536

UNITED STATES PATENT OFFICE 2,320,536

METHOD OF COATING

Maxwell A. Pollack, Franklin Strain, and Irving E. Muskat, Akron, Ohio, assignors to Pittsburgh Plate Glass Company, Allegheny County, Pa., a corporation of Pennsylvania No Drawing. Application December 19, 1939, Serial No. 310,032

4 Claims. (Cl. 117—65)

This invention relates to a method of applying films or coatings of resinous products. It is known that certain compounds such as allyl methacrylate polymerize to form insoluble and infusible polymers. Because of their infusibility and insolubility, however, these polymers are difficult to handle and cannot be used as such for forming paint films or similar coatings. When one attempts to produce coatings of this material by application of the monomer and polymerization in situ, much of the monomer volatilizes, polymerization is irregular, and gas bubbles are often formed. In addition, many compounds polymerize very slowly and form soft products which are not suitable for coatings.

In accordance with our invention, we have been able to provide various materials with coatings which are insoluble, infusible and resistant to wear. We have found that in polymerizing an organic compound which contains two or more polymerizable groups, desirable products may be secured by conducting the polymerization in two stages. Upon polymerization of such a compound, a fusible thermoplastic polymer is preliminarily formed. As polymerization proceeds in the usual manner the polymer is converted into an infusible gel which may be further converted to a hard, infusible, insoluble mass. We have found that the polymerization may be interrupted and the fusible polymer thus produced may be applied to the surface to be coated and the coating cured to an infusible state. By use of the fusible polymer as the coating agent, evaporation of monomer, shrinkage during polymerization, bubble formation, etc., may be avoided.

In general, it is desirable to separate the fusible polymer from some or all of the unpolymerized monomer before application of the polymer to the desired surface. In this manner, it is possible to avoid the usual difficulties which arise in polymerizing coatings containing monomer and to secure hard, glassy, transparent coatings. Polymers prepared in this manner are often harder than polymers prepared in the usual manner.

Applicants have been able to increase the abrasion and solvent resistance of relatively soft resins to a surprising degree by means of the present process. In accordance with this invention, various polymers of saturated esters or amides of acrylic or α-substituted acrylic acids, such as polymerized methyl methacrylate, ethyl methacrylate, methyl methacrylamide, methyl or ethyl acrylate, methyl or ethyl chloroacrylate, or the higher esters or these acids, such as the propyl, butyl, isobutyl, phenyl or stearyl esters thereof, or the monoesters of polyhydric alcohols, such as ethylene glycol monomethacrylate or mixtures of these polymers may be coated in this manner. Other thermoplastic polymers which are sufficiently flexible, transparent and stable to light or heat to permit their use in lieu of glass also may be coated or surfaced in accordance with our invention to provide them with hard, durable, solvent-resistant, and transparent surfaces. For example, various vinyl polymers, such as polyvinyl acetate, polyvinyl chloride, polyvinyl butyrate, polystyrene, polyvinyl butyral or other fusible or other thermoplastic polyvinyl halides or esters of saturated aliphatic acids may be used as base materials. The process is not limited to the coating of such resins, however, but may be applied to the coating of any convenient base, such as infusible resins, wood, metal, rubber, paper, glass, fabrics, cellulose derivatives, or other materials.

Most efficient results have been secured by formation of a coating of a polymer of the unsaturated esters of acrylic and α-substituted acrylic acids or the polyhydric alcohol polyesters of these acids or the corresponding amides thereof, such as allyl acrylate, allyl methacrylate, allyl chloroacrylate, methallyl acrylate, methallyl methacrylate, methallyl chloroacrylate, ethyl allyl methacrylate, crotyl methacrylate, 2-chloroallyl acrylate, 2-chloroallyl methacrylate, oleyl methacrylate, vinyl acrylate, vinyl methacrylate, resorcinol dimethacrylate, glycol dimethacrylate, glycol diacrylate, glycerol di- or trimethacrylate or mixtures thereof, or polyglycol diacrylates, glycerol di- or triacrylate or the acrylic, methacrylic, or alpha-chloroacrylic esters of the higher polyhydric alcohols, such as sorbitol or mannitol wherein at least two of the hydroxyl groups are esterified with the above named acids. Additionally, hard, solvent resistant coatings may be secured through the use of the corresponding amides of the unsaturated acids, such as vinyl, allyl, methallyl, ethyl allyl, or oleyl acrylamides, methacryl amides or chloroacrylamides. In addition, other materials containing polymerizable group $CH_2=C-$ or other polymerizable groups of this type, such as vinyl allylether, divinyl ketone, diallyl crotonamide, diallyl methacrylamide, diallyl acrylamide, monoallyl methacrylamide, allyl styrene or substituted urea derivatives, such as diallyl urea, etc., may also be used.

Other products may be secured by polymerization of other organic oxygen compounds which contain at least two polymerizable groups, preferably those in which the groups are separated by at least one atom whereby the groups are unconjugated. For example, unsaturated aliphatic esters of unsaturated aliphatic acids, such as the unsaturated crotonate esters, allyl crotonate, crotyl crotonate, methallyl crotonate, oleyl crotonate, 2-chloroallyl crotonate, ethylallyl crotonate, or other unsaturated esters, such as allyl oleate, allyl itaconate, allyl propiolate, diallyl maleate, allyl ethyl maleate, dimethallyl maleate, ethyl methallyl maleate, methyl allyl maleate, vinyl allyl maleate, divinyl maleate or other mono or polyester formed by esterification of maleic or fumaric acid or their substituted derivatives with an unsaturated alcohol or allyl citraconate, allyl fumarate, methallyl fumarate, oleyl fumarate, allyl cinnamate or the corresponding methallyl, ethyl allyl, or crotyl esters thereof, or the unsaturated polyesters of saturated polybasic acids and unsaturated monohydric alcohols such as diallyl oxalate, diallyl malonate, di- or triallyl citrate, diallyl tartrate, diallyl phthalate, diallyl carbonate, etc., or the corresponding methallyl or crotyl esters thereof may be used for this purpose. Similarly, the polyesters of polyhydric alcohols and monobasic unsaturated acids such as ethylene glycol dicinnamate, glycerol dicinnamate, glycerol dipropiolate, glycol dipropiolate, or the corresponding esters of other glycols such as the propylene glycols, butylene glycols or polyglycols thereof, or the higher alcohols such as sorbitol or mannitol, etc., may be polymerized in this manner. Other organic compounds which contain at least two polymerizable double bonds and are capable of polymerizing to a final form which is transparent, hard and substantially infusible and insoluble may be used. Thus, unsaturated polyethers of polyhydric alcohols, such as the diallyl, -methallyl, or -crotyl ethers of glycols, such as ethylene, propylene, or butylene glycol or polyglycols, such as diethylene glycol, tetraethylene glycol, etc. or the di- or triallyl, methallyl, oleyl, or crotyl ethers of glycerol or the corresponding polyethers of the higher polyhydric alcohols, such as mannitol or sorbitol may be applied and polymerized in accordance with our invention. In addition, esters of inorganic acids, such as diallyl sulphate, di- or triallyl phosphate, di- or triallyl borate, di- or triallyl phosphite, polyallyl silicates, polyallyl titanates, or similar esters may be polymerized by our process.

In order that a product of maximum surface hardness be produced, it is preferable to make use of compounds wherein the number of carbon atoms in the molecule of the monomeric form is not excessive. Thus, a methacrylate polymer which is surfaced with polymeric allyl or methallyl methacrylate or choloracrylate exhibits a greater resistance to wear and is harder than a similar polymer which is surfaced with polymeric oleyl methacrylate. The trend toward softer products as the number of carbon atoms increase may be minimized by increasing the number of polymerization double bonds in the composition. Thus, sorbitol hexamethacrylate polymerizes to form a product which exhibits greater hardness than does polymeric oleyl methacrylate. In general, it is preferred to make use of agents wherein the ratio of the number of carbon atoms in the number of polymerizable olefinic groups does not exceed 15 and preferably materials wherein this ratio does not exceed 8 are made use of. In addition, it is found that most desirable products are required through use of materials containing not in excess of 10 carbon atoms, in each of the alcohol residues and the acid residues.

The plastic or other base may be coated in the proper manner and under predetermined conditions of operation with the partially or intermediately polymerized material or a solution or dispersion thereof, and the coated product treated to complete polymerization of the surface by means of heat and/or light and/or catalysts with or without pressure. A fusible polymer suitable for coatings in accordance with our invention may be prepared by conducting polymerization in a solution which is capable of dissolving the polymer and interrupting polymerization at the proper time. Thus, when a polymerizable compound containing two or more polymerizable groups, such as allyl chloracrylate, allyl methacrylate, etc., is dissolved in a solvent such as acetone, dioxane, chloroform, etc., a soluble polymer is initially formed, but as polymerization proceeds, the insoluble polymer is produced and the solution is converted into a non-reversible gel. By interrupting polymerization before the gel is formed, a soluble, fusible polymer may be secured. This polymer is found to be soluble in a majority of the solvents in which the polymer of the saturated acrylate or vinyl esters are normally soluble. Acetone, chloroform, toluene, dioxane, triacetin, phenyl cellosolve, ethyl cellosolve acetate, benzene, etc., are suitable solvents in general. The fusible polymers may be recovered by evaporation or distillation of the solvent or by addition of a non-solvent, such as methyl or ethyl alcohol or water.

In each case, the polymerization may be interrupted before the infusible product is produced. This may be accomplished by stopping polymerization as the mixture of monomer and polymer begins to grow viscous and before gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the material is polymerized in solution. Polymerization may be halted also by lowering the temperature of the reaction mixture to a suitable degree, for example, to room temperature or below.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before the polymerization has been initiated.

When the fusible polymer is produced in solution, it may be recovered by methods other than by treatment with a nonsolvent, such as by slow evaporation or distillation of the solvent.

It is also possible to produce the fusible polymer in accordance with our invention without resorting to the use of solutions of the monomer. Thus, the monomer may be polymerized directly by use of heat and/or light, preferably in the presence of catalysts such as air, ozone, oxygen, peroxides and the like, and interrupting polymerization at the proper time. Since the polymerization proceeds without undue rapidity with many of these materials, the reaction may be stopped before the gel state is reached without difficulty either by use of inhibitors or by cooling as hereinbefore mentioned.

The fusible polymer so produced may be applied to any desired base and subsequently cured to the infusible state. In some cases this may be done without separation of the polymer from the monomer. Often, however, it is found that if considerable monomer is retained by the polymer upon curing, considerable difficulty is encountered in securing complete or substantially complete polymerization of the residual monomer. This may be undesirable. Accordingly, we have found that at times it is desirable to remove all or a portion of the monomer prior to curing the polymer to its infusible state. In accordance with one convenient method, the monomer may be distilled from the polymer under conditions whereby the possibility of further polymerization is minimized, for example, by distillation in a vacuum, preferably at low temperatures, or in the presence of added inhibitors. Similarly, the monomer may be extracted with a solvent in which the polymer is insoluble such as methyl or ethyl alcohol. Additionally, the polymer and monomer may be separated by dissolving the product in a solvent for both monomer and polymer and adding a nonsolvent to precipitate the fusible polymer.

The method of preparing the fusible polymer by direct polymerization of the monomer is particularly adapted to the treatment of those materials which polymerize without undue rapidity such as allyl crotonate or other unsaturated crotonates or glycol dicrotonate or similar polycrotonate or the itaconates, oxalates, maleates, citrates, phthalates, etc. In the case of materials which polymerize with greater rapidity, such as the acrylates, methacrylates, or chloroacrylates, recovery of substantial yields of the fusible material by direct polymerization is exceedingly difficult, and only minor yields are generally obtained. Accordingly, it is preferred to treat such polymers in the presence of a solvent for the polymer as previously described.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften upon heating. They are precipitated from solutions by use of nonsolvents as a white amorphous powder. The exact softening points of the products are dependent to a great degree upon the temperature, catalyst concentration and monomer concentration of the solution undergoing polymerization.

The time required for polymerization to the fusible state is dependent upon the nature of the material, the catalyst concentration and the temperature of polymerization. In the case of the acrylate esters polymerization in solution for a period of 4 hours is found to be satisfactory when the temperature is 60° C. This period must be materially shortened with rising temperature and at 100° C. it is found that the fusible polymer must be recovered within a few minutes after the polymerization reaction is initiated. Similar variations of time of polymerization in accordance with the temperature is found necessary in treating other polymerizable materials. In any case, however, the polymer is preferably recovered by interrupting polymerization as the monomer undergoing treatment grows viscous since after solidification thereof the polymer may be found to be substantially insoluble.

The fusible polymer thus produced may be applied as a coating and is cured after application in a convenient manner by means of heat and/or light with or without catalysts. In coating thermoplastic or other bases, such as polymers derived from methyl methacrylate with the fusible convertible polymer, the polymer is generally applied as a solution which is allowed to evaporate to form a film. The fusible polymer of the type herein described are soluble in the solvents which are generally used for other fusible vinylic polymers, such as acetone, carbon tetrachloride, trichloro ethylene, tetrachloroethylene, xylene, toluene, benzene, dioxane, chloroform, triacetin, phenyl cellosolve, etc. After the film has dried, the product may be subjected to polymerization conditions in order to convert the surface film to the infusible state. Pressure may be applied to the film, if desired, in order to promote adhesion and impart smoothness to the surface. In general, the coated sheet is cured by applying a smooth surfaced mold such as a glass plate to the coated surface and polymerizing the coated surface in contact with the mold. In some cases it is unnecessary to resort to the use of solutions since the fusible polymer may be applied alone, either in the solid state or by melting a polymer such as fusible allyl crotonate and applying in molten state.

In many cases the fusible polymer may be prepared in the presence of the solvents and applied as a coating agent without separating the polymer and monomer. In such cases it is often observed that the resulting fusible polymer cures more rapidly than when it is precipitated from solution. By operation in accordance with this modification, the base is coated with a composition containing both monomer and polymer as polymerizable constituents. In such a case, however, it is generally desirable that the intermediate fusible polymer be present in an amount in excess of that which can be obtained under normal circumstances by partially polymerizing, undissolved or undiluted monomer. Generally, speaking, the fusible polymer should comprise a major portion of the polymerizable constituents in the coating composition. For the more active materials such as allyl, methallyl, ethylallyl, or chloroallyl acrylate, methacrylate, or choroacrylate, or the corresponding polyhydric alcohol polyesters, the fusible polymer content should be above 10 percent by weight of the polymerizable constituents. For less active products, such as diallyl phthalate, or diallyl maleate, the fusible polymer content should be above 35 percent and preferably above 50 percent or more of the polymerizable constituents in the coating composition.

In order to insure the production of a transparent sheet which is free from surface defects and which possesses a coating having optimum adhesion, it is preferred that the infusible polymer be present as a very thin film. Preferably, this film should be of such thinness that a pressure which is just sufficient to cause the base plastic to yield will also cause the film to yield in a corresponding manner without fracture or impairment of the film. In applying films, such as allyl methacrylate, etc., to polymethyl methacrylate, it is found that optimum results may be secured by application of not substantially in excess of 20 gms. of the coating material per sq. ft. of methacrylate surface to be coated. The films thus produced are below 0.01 inch and preferably below 0.002 inch in thickness, being in general, about 0.0003 inch thick. It is to be understood, however, that the critical thickness for maximum hardness and adhesion varies with the composition of the plastic base, plasticizers used therein, flexibility thereof, etc., and that products having substantially greater thickness may be produced, if desired.

By use of a film of such thickness it is possible to obtain a product of unusual scratch resistance which is superior to the scratch resistance of the surface polymer. To a large degree this is due to the higher flexibility of thin films and to the fact that the flexible thin films when in close adherence to the base plastic possess great resiliency and elasticity and resist penetration. The polymers derived from allyl methacrylate, or glycol methacrylate or glycerol methacrylate and similar materials are not only harder than polymers of methyl methacrylate but also are somewhat more rigid and brittle. Thus, where the film is relatively thick a stress applied at some point on the surface thereof is not transmitted to the plastic below the film at any single point. In consequence, when a weighted point is drawn across such a thick film, the film itself takes up most of the weight of the point and the scratch resistance of the surface thereof is merely the scratch resistance of the film.

In contrast, when a weighted point is drawn across the surface of a coated plastic having a thin film of the surfacing polymer, both the base polymer and the surface polymer cooperate in resisting deformation under the point, some of the stress being transmitted to each. Since the film is thin it is sufficiently flexible to conform to small deformation of the base without fracture and since it resists penetration, scratching by the weighted point is thereby avoided.

Stress applied to a localized portion of such a coated sheet may result in a transient yielding of the surface thereof but upon release of the applied stress the base, by reason of its elasticity, returns to its original form, and since the film remains unfractured and unpenetrated, the coated product remains unscratched and undeformed. In general, the thin films used in accordance with this invention are not fractured until the base is deformed to a visible, substantially permanent degree. In many cases the coated sheets have been bent to an angle of 10 or more degrees without apparent fracture or impairment of the film.

In some cases, difficulty may be encountered in securing a coating which is sufficiently adherent and free from fractures or other surface defects for commercial use. Difficulties of this nature are often encountered in applying unsaturated acrylates, such as allyl methacrylate to cellulose thermoplastics, such as cellulose acetate. In such a case, it is desirable to provide the thermoplastic with an intermediate coating of a more mutually compatible composition, such as a coating of cellulose nitrate.

The following examples are illustrative:

*Example I.*—A mixture of 75 parts by weight of benzoyl peroxide, 225 parts by weight of monomeric allyl methacrylate and 1275 parts by weight of acetone was refluxed at 63° C. for three hours. 2800 parts by weight of methyl alcohol was then added to the mixture. The resulting mixture was then poured, with stirring, into 1000 parts by weight of a methyl-alcohol-water mixture containing 80 percent of methyl alcohol by volume. The precipitate thus formed was coagulated and recovered from solution.

A sheet of commercial molded "Lucite" which is a commercially available polymer of methyl methacrylate was pressed between smooth plates in order to render the surface more homogeneous and smooth. A xylene solution containing 5.5 grams of polymer per 100 cc. of solution was poured and spread evenly over the surface of the pressed plastic. 14.4 cc. of solution was applied per square foot of surface and the coated product was air-dried for 35 minutes. The "Lucite" sheet was then coated on the opposite side in the same manner and was then pressed between glass plates at a pressure of 1000 lbs. per sq. in. and at a temperature of 150° C. for 40 minutes. The coated sheet thus produced was colorless, transparent, and free from surface defects. In order to compare its scratch resistance with glass, a diamond point pencil weighted with varying weights was applied to sheets of glass and the coated "Lucite" prepared in accordance with this sample. It was observed that heavier weights were required to produce visible scratches on the coated "Lucite" than were required to produce such scratches on glass. The abrasion-resistance of the coated product to falling 40–60 mesh silica sand, using the apparatus described in "Physical and Chemical Examination of Paints, Varnishes, Lacquers and Color," by Gardner, 6th edition, page 222–223, was found comparable to that of glass rather than to that of uncoated "Lucite."

*Example II.*—55 parts by weight of allyl chloroacrylate was heated with 3 parts by weight of benzoyl peroxide and 350 parts by weight of acetone at a temperature of 60° C. for 4 hours. At this time, 300 parts of methanol were added to produce turbidity, and the resulting mixture was poured slowly with stirring, into 1600 parts of methanol. The white voluminous precipitate thus formed was filtered and dried, and was soluble in acetone and chloroform, and softened at 110–125° C. It was a highly plastic gum at 140–150° C., hardening with further heating.

A sheet of polymerized methyl methacrylate was coated with a xylene solution containing 5.5 grams of this polymer and 0.5 gram of benzoyl peroxide per 100 cc. of solution as described in Example I, and the coated product was heated between glass plates to 140° C. at a pressure of 875 pounds per square inch for six minutes. The product obtained was clear and free from surface defects and its resistance to scratch was comparable to that of the product produced in accordance with Example I.

*Example III.*—45 grams (0.5 mole) of anhydrous oxalic acid, 116 grams (2.0 moles) of allyl alcohol, and 3.2 grams of p-toluene-sulfonic acid were heated together at 130–140° C. for 22 hours. The water and excess alcohol were then removed by slow distillation. The diallyl oxalate was then distilled at a temperature of 106–107° C. under a pressure of 6 mm. of mercury.

A sample of diallyl oxalate containing 5 percent by weight of benzoyl peroxide was heated until it became viscous. It was then poured into methyl alcohol to recover the fusible polymer. A solution containing 5.5 grams of the fusible polymer and 0.5 gram of benzoyl peroxide per 100 cc. of solution was applied to the surface of a sheet at 150° C. and under a pressure of 1200 pounds per square inch for 10 hours. The cured sheet possessed a hard, solvent-resistant surface.

*Example IV.*—A quantity of monomeric ethylene glycol dicrotonate was heated with 5 percent by weight of benzoyl peroxide at 150° C. until the solution became viscous. The solution was then cooled to room temperature and introduced into an equal portion of acetone and the fusible polymer was precipitated with methyl alcohol as in Example I. A coating of a 5 percent solution of this polymer containing 0.5 percent benzoyl peroxide was applied to the surface of a polymer of methyl methacrylate. After this coating was dried the coated polymer was placed in a mold and heated to a temperature of 150° C. for 2 hours, at a pressure of 1000 pounds per square inch. The article possessed a hard, solvent-resistant surface.

*Example V.*—A 15 percent solution of glycol dimethacrylate dissolved in acetone and containing 1 percent benzoyl peroxide was refluxed for 2 hours. The solution was then treated with methyl alcohol as described in Example I and a white acetone soluble precipitate was produced.

A xylene solution containing 5.5 grams of this precipitate per 100 cc. of solution was applied to the surface of a sheet of methyl methacrylate polymer in the manner described in Example I and a product having a hard, wear-resistance surface was thereby secured.

*Example VI.*—A quantity of monomeric allyl crotonate was heated in a stream of air at a temperature of 150-160° C. until the liquid began to get viscous. The liquid was then dissolved in acetone and the fusible polymer was precipitated with methyl alcohol in the manner described in Example I. The precipitated polymer was recovered as a white, gummy mass which dried to form a white, acetone soluble powder. A 5 percent solution of this powder containing 0.5 gram of benzoyl peroxide in xylene was applied to a sheet of polymeric methyl acrylate and cured in a mold at a pressure of 1000 pounds per square inch at a temperature of 140° C. for 2 hours. The resulting product possessed a hardened, solvent-resistant surface.

*Example VII.*—A sheet of cellulose acetate was coated with a film of nitrocellulose and then coated with fusible allyl methacrylate in the manner described in Example I and sheet having a hard, solvent-resistant surface was thereby secured.

*Example VIII.*—A quantity of diallyl phthalate was prepared by heating a mixture of allyl alcohol and phthalic anhydride, which contained allyl alcohol in an amount slightly in excess of the theoretical amount required for diallyl phthalate, to a temperature of 90-95° C. in the presence of 2 percent paratoluene-sulphonic acid for 15 hours. The mixture was washed with 0.1 N sodium hydroxide solution to remove acid and unreacted material and the diallyl phthalate was recovered by distillation at a pressure of 6 millimeters and a temperature of 170° C.

One part by weight of diallyl phthalate was heated at 150° C. for two and one-half hours and was then dissolved in two parts by weight of acetone. Methyl alcohol was added to the solution in an amount required to completely precipitate the polymer. This polymer was then redissolved to form a 10 percent solution in acetone which contained 1 percent benzoyl peroxide, and a sheet of polymerized methyl methacrylate was dipped into the soluiton. The dipped sheet was then heated at a temperature of 150° C. under a pressure of 1000 pounds per square inch for 4 hours. The resulting product possessed a hardened, solvent-resisting surface.

*Example IX.*—A quantity of ethyl allyl maleate was heated with one percent benzoyl peroxide at 130° C. for 15 minutes, and when the product begain to grow viscous heating was then discontinued and sufficient methyl alcohol was added to completely precipitate the polymer. The polymer was then redissolved in acetone to form a 5 percent solution thereof which contained 0.5 percent of benzoyl peroxide. This solution was applied to a sheet of polymeric methyl methacrylate and the sheet was heated in a mold at 150° C. under a pressure of 1200 pounds per square inch for 6 hours, whereby a product having a hardened, solvent-resistant surface was secured.

*Example X.*—15 cc. of the xylene solution of the allyl methacrylate polymer described in Example I was applied to each square foot of surface of a sheet formed by the cast polymerization of a mixture of 80 parts of vinyl acetate, 20 parts of diallyl succinate and 5 parts of benzoyl peroxide and curing at 120° C. The product was dried and cured under pressure of 1000 pounds per inch for one hour.

*Example XI.*—A xylene solution of glycol dimethacrylate prepared as described in Example V was applied as in Example I to the surface of a copolymer formed by copolymerizing 50 parts of diallyl maleate and 50 parts of methyl methacrylate and the coated product was dried and cured as described in Example I.

Although the present invention has been described and claimed with reference to the specific details of certain embodiments thereof, it is not intended that such details shall be regarded as limitations upon the scope of the invention except insofar as included in the accompanying claims.

We claim:

1. A method of preparing a coated sheet of a thermoplastic resin which method comprises partially polymerizing in the presence of organic peroxides a compound having two polymerizable unsaturated groups separated by at least one oxygen linkage, interrupting the polymerization before the polymer is converted into an infusible and insoluble gel, separating the partial polymer from unpolymerized compound, dissolving the partial polymer in a suitable solvent, applying a continuous film of the solution to a sheet of said thermoplastic resin, drying the sheet by evaporating the solvent, completing the polymerization by heating between smooth surfaces in the presence of organic peroxides.

2. A method of preparing a coated object of a thermoplastic resin which method comprises partially polymerizing a compound having two polymerizable unsaturated groups separated by at least one oxygen linkage, interrupting the polymerization before the polymer is converted into an infusible and insoluble gel, separating the partial polymer from unpolymerized compound, applying a uniform layer of the polymer to the surface of a thermoplastic resin object, completing the polymerization of the coating in contact with a smooth surface.

3. A method of preparing a coated object of a thermoplastic resin which method comprises partially polymerizing a compound having two polymerizable unsaturated groups separated by at least one oxygen linkage, interrupting the polymerization before the polymer is converted into an insoluble and infusible gel, adding a substantial portion of a solvent in which partial polymer is soluble, applying a continuous film of the solution to thermoplastic resin object, drying the object by evaporating the solvent, and completing the polymerization of the coating in contact with a smooth surface.

4. A method of preparing a coated object of a thermoplastic resin which method comprises partially polymerizing a compound having two polymerizable unsaturated groups separated by at least one oxygen linkage, interrupting the polymerization before the polymer is converted into an insoluble and infusible gel but after at least 35% has been polymerized, applying the partial polymer uniformly to the surface of the thermoplastic resin object, and completing the polymerization of the coating in contact with a smooth surface.

IRVING E. MUSKAT.
MAXWELL A. POLLACK.
FRANKLIN STRAIN.